(12) United States Patent
Broadhurst

(10) Patent No.: US 6,316,880 B1
(45) Date of Patent: Nov. 13, 2001

(54) CONSTANT OR VARIABLE BRIGHTNESS FLASHLIGHT

(76) Inventor: John H. Broadhurst, 1560 Sumter Ave. North, Golden Valley, MN (US) 55427

(*) Notice: Subject to any disclaimer, the term of this patent is extended or adjusted under 35 U.S.C. 154(b) by 0 days.

(21) Appl. No.: 09/513,901

(22) Filed: Feb. 28, 2000

(51) Int. Cl.[7] .................................................. H05B 37/02
(52) U.S. Cl. ..................... 315/200 A; 315/158; 315/159; 315/307
(58) Field of Search ............... 315/200 A, 175, 315/176, 307, 158, 159

(56) References Cited

U.S. PATENT DOCUMENTS 5,418,433 * 5/1995 Nilssen ................................. 315/175

* cited by examiner

Primary Examiner—David Vu
(74) Attorney, Agent, or Firm—Herman H. Bains

(57) ABSTRACT

A constant or variable flashlight includes a semi-conductor boost/buck controller electrically connected to an inductor. The controller is operable to cyclically charge the inductor and then cause the stored energy to be delivered to the flashlight lamp in cycles repeating at a rate between 10,000 and one million cycles per second. A photo-responsive feedback circuit connected to the controller is operable for modulating the current to the lamp in response to an imbalance between a standard potential and the feedback circuit. Arrangements are provided for selectively changing the brightness of the lamp necessary to produce a balance of potential between the standard potential and the feedback current.

7 Claims, 2 Drawing Sheets

CONSTANT OR VARIABLE BRIGHTNESS FLASHLIGHT

FIELD OF THE INVENTION

This invention relates to flashlights and more particularly to a constant or variable brightness flashlight which maintains the flashlight light flux until the batteries reach the final end of lifepoint.

BACKGROUND OF THE INVENTION

The flashlight, a small portable device consisting of a small incandescent bulb, a battery and a normally open switch contained in a small plastic or metal casing, has been known to society for many years. Improvements have been made in the construction and operation, for example, the carbon-zinc cell has been almost completely replaced by the alkaline cell while the incandescent bulb has been improved by using xenon as a filling gas and by other similar changes.

However, there remain two fundamental shortcomings of the present day flashlight. One is due to the characteristics of the tungsten filament lamp or bulb which physically approximates to a black body radiator. Such a black body radiates light proportional to the fourth power of the filament temperature. This means that when the batteries are fresh, there is an adequate flux of light, but as batteries age, the light becomes rapidly weaker and more reddish due to the lower operating temperature of the filament. Although alkaline batteries have much flatter voltage versus time discharge characteristics than the earlier carbon-zinc version, increasing internal resistance during discharge still results in steadily decreasing terminal potential and hence light output over the operating life.

A second shortcoming is the inability to reduce the light output at will to either conserve battery life or to avoid an excessive light which decreases dark adaptation. This latter problem afflicts pilots flying at night who need to use a flashlight for finding maps and other objects in the cockpit, nursing staff or security guards conducting night inspections, and other similar users. As of today, this is alleviated by fitting red filters over the flashlight lens, but this reduces visual intensity without any compensating increases of battery life. Also there is not control of the intensity of the red filtered light, if adequate with a new battery it rapidly becomes insufficient as the battery ages.

SUMMARY OF THE INVENTION

An object of this invention is to provide a novel flashlight which is operable for maintaining the light flux at a selectively set and stabilized brightness until the batteries reach the final end of the lifepoint. The operating circuitry for the flashlight includes a commercially available semiconductor boost/buck converter which controls charging and discharging of an inductor, the latter supplying electrical energy to the lamp. "Boost" and "buck" are used in the conventional electronic sense, meaning respectively, step up and step down. Bucking would involve using a higher voltage battery than the flashlight bulb and then using the converter to reduce the voltage applied to the bulb. Servo control of the energy to the lamp is achieved by feedback from a photosensor. In the novel flashlight the brightness of the emitted light does not depend on either the reduction of terminal voltage or increase in internal resistance of the flashlight during their discharge. This therefore maintains the usefulness of the instrument as a light source until all the energy has been extracted from the batteries.

Another object of this invention is to provide a novel flashlight in which the stabilization point of light output by feedback from a photosensor can be readily adjusted downwardly to provide less light without the waste of energy in an optical absorber placed over the lamp. The stabilization point may also be adjusted upwardly to obtain a high flux of light with commensurate reduction in lamp and battery lifetime. Therefore, without significant loss of efficiency, the brightness of the emitted light can be reduced as needed thus prolonging the hours of light obtainable from a set of batteries or can be increased in an emergency mode to provide brilliant light for a short period.

A further object of this invention is to provide a novel flashlight having a low voltage source of electrical current (batteries) but arranged and constructed to operate a much higher voltage and more efficient lamp.

Another object of this invention is to provide a novel flashlight having primary on-off switch which is operable to turn on logic signal to the energy controller, the operation of the latter being insensitive to switch contact resistance.

DESCRIPTION OF THE PREFERRED EMBODIMENT

Figure 1:
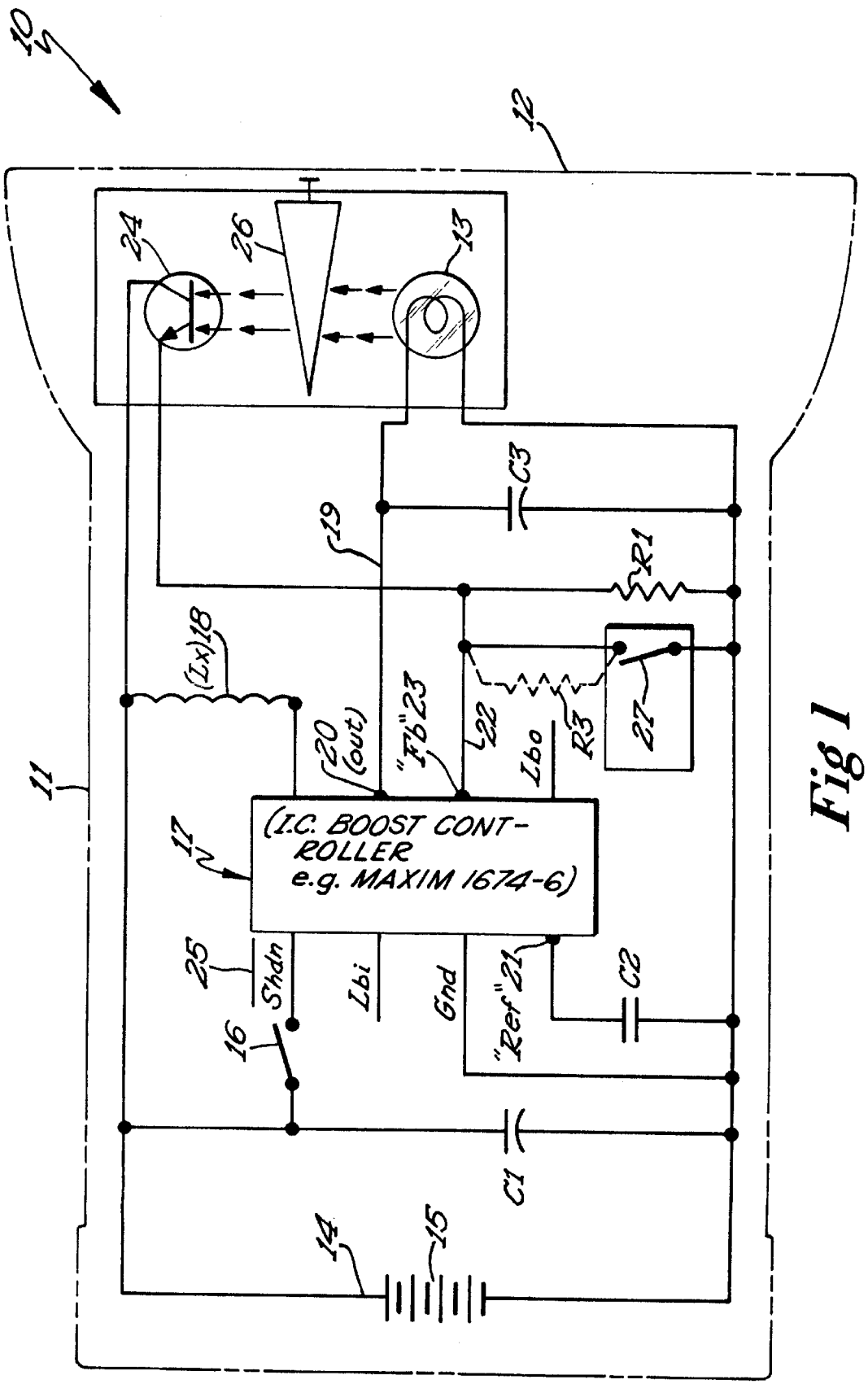
FIG. 1 is an electrical schematic diagrammatically illustrating one embodiment of the novel flashlight.

Referring now to FIG. 1 of the drawing, it will be seen that the novel flashlight, designated generally by the reference numeral 10, is thereshown. The flashlight 10 includes a casing 11 which may be formed of plastic or metal and is provided with a transparent plate or lens 12 at one end thereof in the conventional manner. The casing 11 contains the flashlight circuitry therein which includes a lamp or incandescent bulb 13. In the embodiment show, the circuitry also includes a power circuit 14 including a plurality alkaline batteries 15 which are electrically connected to the lamp 13.

The power circuit includes a normally open primary control switch 16 which is electrically connected to an I.C. boost/buck controller 17. The I.C. boost/buck controller 17 is commercially available and in the embodiment shown is a Maxim 1674-6. Other suitable equivalent I.C. boost/buck controllers maybe used such as those manufactured by Toko or other semiconductor manufacturers.

The boost/buck controller 17 is electrically connected to an inductor circuit including an inductor (Lx) 18 which is electrically connected to the power circuit 14. It will be noted that an "Out" terminal 20 of the boost/buck controller 17 is electrically connected to the lamp 13 by a conductor 19. Current from the batteries 15 flows through the inductor 18 and through a turned on first FET switch (not shown) in the I.C. boost/buck controller 17 back to the battery. Following the usual electromagnetic laws, the current starts at zero at the moment the internal switch (FET) closes, and increases linearly with time or:

$$dI/dt = v/Lx$$

When V us the voltage of the battery(s), and dI/dt is the rate of change of current with time. As the current increases, energy is stored in the inductor (Lx) 18, proportional to the square of the current, i.e.

$$E = (\tfrac{1}{2})(Lx)xI^2$$

When the current has increased to a given value, the first FET switch in the I.C. boost/buck controller 17 is opened, and the same time a second FET switch (not shown) in the I.C. boost/buck controller is closed, transferring the energy stored in the inductor (Lx) 18 into the "Out" terminal 20 and then into the lamp 13. When the energy stored in the inductor 18 has reached zero, the second FET switch opens, the first FET switch closes and the cycle repeats. The effect is therefore to transfer "buckets" of energy from the battery into the inductor and then into the lamp 13 (load).

In practice this process repeats at a rate between 10,000 and one million times per second. Capacitors C1 and C3 are provided and average the current drawn from the battery(s), and current delivered to the lamp 13, so that the intermittent nature of the load-unload cycles do not cause undue resistive losses, and also avoid the radiation of radio-frequency noise from the circuit. Capacitor C2 is required by the design of the I.C. boost/buck controller 17 and is not fundamental to the operation.

Control of the energy delivered to the lamp 13 (load), can be achieved in one of two ways, the inductor (Lx) 18 can be loaded with energy and unloaded a fixed number of times per second, but the maximum current in the inductor (Lx) 18 (Energy=$I^2$) before can be varied in order to control the energy per "bucket" transferred. Alternatively the maximum current in the inductor (Lx) 18 can be held constant, and the number of the "buckets" transferred per second varied. Advantages are claimed for both methods of control. The former method is the one used in the embodiment shown.

Control of the energy transfer is obtained by an "error" amplifier (not shown) in the I.C. boost/buck controller 17, which compares the standard on the "Ref" (reference) pin 21, and increasing or decreasing the energy transfer to obtain a balance. A feedback circuit 22 including a "Fb" (feedback) pin 23 is electrically connected to the power circuit 13 and a photosensor 24. The "Ref" pin 21 and "Fb" pin 23 are components of the I.C. boost/buck controller. It will be seen that any system which modulates the potential on the "Fb" pin 22 will control energy delivered to the lamp 13.

The circuit, namely the power circuit 14, is provided with a Shdn (shutdown) connection 25. A logic level of either zero or battery voltage will turn the device (flashlight) on or off, thus providing a way of interrupting the flow of energy to the lamp 13, and turning off the flashlight. The logic level is at low current (<1 milliamp) and this is not sensitive to contact resistance of the on-off switch 16.

One of the unique features of the novel flashlight is the servo control of the energy supply by directly observing the brightness of the lamp 13 of the flashlight. A small fraction of light from the lamp 13 is incident on the photosensor 24 which may be a cadmium selenide photocell, cadmium telluride photocell or a photo transistor. The photosensor 24 provides a flow of current, in this case from the battery 15 to "Fb" pin 23 and then through resistor R1 to ground, which is proportional to the intensity of the light on the phototransistor 24. This current flow through Ri raises the potential at the "Fb" pin 21 until it is the same as at the "Ref" pin 21. At this point the I.C. boost/buck controller 17 will start to reduce the energy transfer to the lamp 13 in order to maintain this balance. Note that in the implementation shown a phototransistor is used as the photosensor. This device (unless not in saturation) provides a flow of current through it which depends on its illumination and which is insensitive to the voltage across the device. This balance will be maintained irrespective of the battery voltage until the battery can no longer provide energy to the circuit. If a photoconductive sensor is substituted, then it may be necessary to connect it to an independent stabilized voltage source. The control point is therefor when the photosensor 24 provides the "correct" current to produce balance.

There are two methods of changing the brightness of the lamp 13 necessary to produce a balance of potential between the "Fb" pin 23 and the "Ref" pin 21. One method is to place a variable optical density filter 26 between the lamp 13 and photosensor 24 as shown in the embodiment of FIG. 1. If the variable optical density filter 26 is set to dense, then the lamp 13 will have to be very bright to pass sufficient light to the photosensor 24. Conversely, if the filter 26 is at the less dense end, then a much dimmer lamp 13 will be sufficient to provide the light needed to produce a balance current from the photosensor 24.

Figure 2:
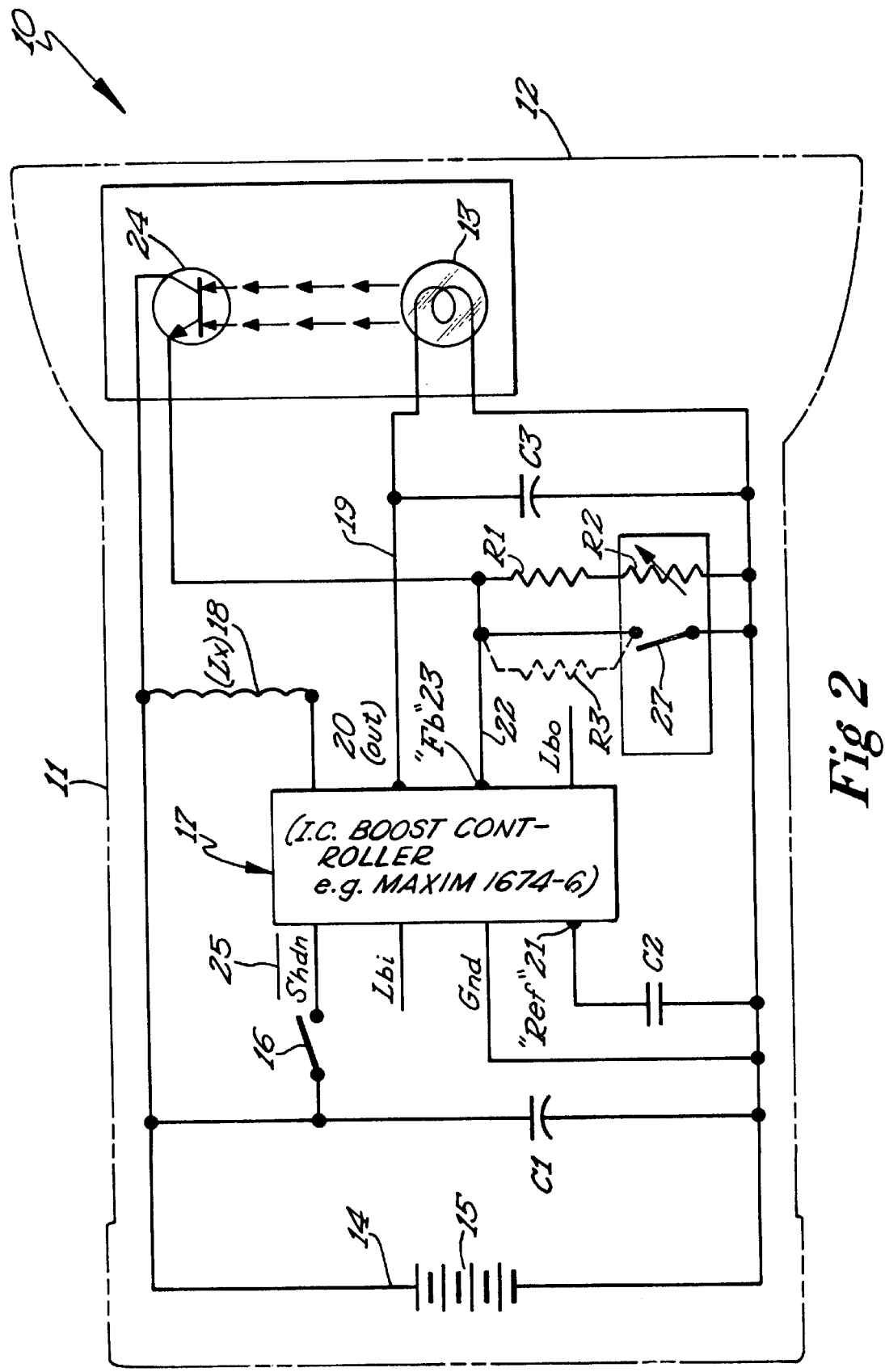
FIG. 2 is an electrical schematic similar to FIG. 1 and illustrating another embodiment of the flashlight.

The second method is to allow light to fall unrestricted on the photosensor 24, but to change the current the cell must produce to achieve "balance". This second method is illustrated in FIG. 2 and is achieved by changing the value of "R1". In FIG. 2, a fixed resistor R1 and a variable resistor R2 are provided.

With the exception of the addition of the variable resistor R2 and the omission of the filter 25, the embodiment of FIG. 2 is otherwise identical to the embodiment of FIG. 1. The potential at the "Fb" pin 23 (FIG. 2) will be the current produced by the photosensor 24 times the variable resistance R1 and R2. As the current in the photosensor 24 is proportional to the brightness of the lamp 13, varying "R1" (FIG. 1), now R1 and R2 in FIG. 2, will therefore alter the controlled value of the lamp brightness.

In both embodiments (FIG. 1 and FIG. 2) a switch 27, also designated "flash" on the drawings, is provided. The switch 27 is normally opened and, when closed, shorts the "Fb" pin 23 to ground. It is therefore impossible for the "error amplifier" of the I.C. boost/buck controller 17 to achieve balance. The I.C. boost/buck controller 17 will therefore deliver all the power of which it is capable (in the embodiment of the I.C. boost/buck controller 17 the voltage across the lamp 13 will rise to a maximum of five volts), and the lamp 13 will therefore glow brilliantly. With a larger capacity I.C. boost/buck controller, it would be necessary to add a suitable resistor shown dotted as R3 in series with the switch 27 to limit the maximum energy delivery.

Use of the "flash" switch 27 can be used for "emergency" illumination, or if the flashlight is first adjusted to a low brightness level, can be used to send a coded (e.g. Morse code) signal, or even "flashed" on and off both to save battery consumption and to aid the location of a lost person (e.g. a downed airman or sailor). This application is important since the peripheral vision of a person searching is much more sensitive to variations in brightness rather than a steady light signal.

Although the I.C. boost/buck controller 17 is a commercially available unit (Maxim 1674-6), it is instructive to briefly describe its functional components. The controller 17 is provided with a electronic switch which can be closed and allow current from the primary supply (battery or A.C. line) to build up in the inductor. In the embodiment shown, the electronic switch is a FET (field effect transistor) although other suitable switches can be used including bipolar transistors, IGBT transistors etc.

The controller 17 also includes a current sensing device, a low value resistor in the inductor-FET switch circuit, which monitors the instantaneous current in the inductor (Lx) 18. The controller 17 is also provided with a comparator which compares the instantaneous current in the inductor with an adjustable limit.

A reference generator is the controller 17 produces a standard potential, used both as a reference for the comparator, and also as a reference for the power delivery system. An error amplifier in the I.C. boost/buck controller compares information returned from the power delivery system (e.g. the terminal voltage being delivered by a power supply). suitably adjusted, with the reference generator. Differences in potential between the feedback circuit from the power delivery system and the reference generator control the cyclic operation of the controller, delivering more or less energy as needed. Start-up and shut-down circuitry are provided for enabling the power supply to turn on and to be shut down. The controller 17 is connected to ground by conductor GND. The symbol Lbi designates low battery in, and the symbol Lbo designates low battery out, the additional functions of this commercial device which are not used in this implementation. These designation are design features of the controller 17.

The switching supply controller 17 cyclically loads the inductor 18 with energy and transfers the energy into the power supply system. While some controllers use an external diode to regulate the transfer energy to the power supply system and prevent the energy flowing in the reverse direction while the inductor is recharging, the controller 17 use a second switch (FET) which is closed at the correct part of the cycle to transfer energy and then opened to prevent reverse flow into the inductor (Lx) 18.

As pointed out hereinabove, the controller 17 transfers the energy a fixed number of times per second, but varies the current (and therefore the energy) in the inductor (Lx) 18 before each transfer to the "error amplifier" information of the power system needs. Other controllers make a transfer of energy each time the inductor reaches a given current flow (and hence a given amount of energy), but varies the number per second. Both methods control the total energy transfer per second (Joules/second=watts) and the present application embraces both methods. While both systems are deemed "best", different conditions of use of the transferred energy will favor one system or the other. However, in the present flashlight application, there is no difference between the performance of either system.

From the foregoing description, it will be seen that I have provided a novel flashlight which is operable such that the flashlight light flux remains at a set and stabilized brightness until the batteries reach the final end of life point.

What is claimed is:

1. A constant or variable flashlight for maintaining the flashlight light flux at a selectively set and stabilized brightness until the batteries reach the final end of life point, comprising, a casing, an incandescent lamp in the casing, a power circuit including a battery electrically connected to the lamp, means in the power circuit for turning the power circuit on and off.

an inductor circuit electrically connected to said power circuit and including an inductor for storing and discharging electric current, a semi-conductor boost/buck controller electrically connected to said power and inductor circuits and being operable to cyclically first charge and store electrical energy in said inductor, then discharge the stored energy into the lamp, the cycle repeating at a rate between 10,000 and one million cycles per second, thereby delivering pulses of energy to the lamp, a photo-responsive feedback circuit electrically connected to the boost/buck controller and including photo-responsive means generating electrical current in response to incident light from the lamp, said boost controller comparing the feedback current to a reference potential and modulating the current to the lamp necessary to produce a balance of potential between the reference potential and feedback current, and means for selectively changing the brightness of the lamp necessary to produce a balance of potential between the reference potential and feedback current.

2. The flashlight as defined in claim 1 wherein said means for selectively changing the brightness of the lamp comprises an adjustable density wedge disposed between the lamp and the photo-responsive means and being adjusted to selectively vary the light incident on said photo-responsive means.

3. The flashlight as defined in claim 1 wherein said means for selectively changing the brightness of the lamp comprises means for selectively varing the resistance in said feedback circuit.

4. The flashlight as defined in claim 1 wherein said photo-responsive means comprises a phototransistor, or other photoconductive sensor.

5. The flashlight as defined in claim 1 wherein said means for turning the power circuit on and off comprises a logic level switch which is operable for controlling a low current, logical signal, obviating changes in brightness due to variations of contact resistance of the said switch.

6. The flashlight as defined in claim 1 wherein the current in the inductor is loaded and unloaded a selected predetermined number of times per second while selectively varing the magnitude of the maximum current in the inductor.

7. The flashlight as defined in claim 1 wherein the maximum current in the inductor is maintained at a constant level and the number of pulses transferred to the lamp are selectively varied.

* * * * *